United States Patent [19]

Chao

[11] Patent Number: 4,870,480
[45] Date of Patent: Sep. 26, 1989

[54] SUBNYQUIST DEMODULATOR AS FOR A TELEVISION RECEIVER

[75] Inventor: Tzy-Hong S. Chao, Morrisville, Pa.

[73] Assignee: RCA Licensing Corporation, Princeton, N.J.

[21] Appl. No.: 205,769

[22] Filed: Jun. 13, 1988

[51] Int. Cl.[4] .............................................. H04N 9/66
[52] U.S. Cl. ...................................... 358/23; 358/16; 329/357
[58] Field of Search ...................... 358/23, 40, 310, 13, 358/16; 375/39; 329/104

[56] References Cited

U.S. PATENT DOCUMENTS

| | | | |
|---|---|---|---|
| 2,795,643 | 12/1952 | Lockhart | 178/5.4 |
| 4,306,307 | 12/1981 | Levy et al. | 375/15 |
| 4,616,252 | 10/1986 | Schiff | 358/23 |
| 4,633,330 | 12/1986 | Yamamitsu et al. | 358/310 |
| 4,686,570 | 8/1987 | Lewis, Jr. et al. | 358/188 |
| 4,703,357 | 10/1987 | Ng et al. | 358/166 |

OTHER PUBLICATIONS

Stein, S. Schwartz, M. S. & Bennet, W. R. Communications Systems and Techniques, McGraw Hill, 1966, pp. 29-38.

Primary Examiner—James J. Groody
Assistant Examiner—Robert M. Bauer
Attorney, Agent, or Firm—Joseph S. Tripoli; Eric P. Herrmann; James B. Hayes

[57] ABSTRACT

An asymmetrical sideband modulated (ASM) signal, such as an RF NTSC television signal is demodulated into in-phase and quadrature phase components, each of which are sampled at a sampling rate that is less than the Nyquist rate for the components. The signals, each of which includes aliasing distortion, are respective real and imaginary parts of a complex signal that is not subject to aliasing distortion at the chosen sampling frequency. The in-phase component of the signal is recovered by inserting zero-valued samples interstitially into each of the sampled in-phase and quadrature phase signals and then applying the modified signals to a complex filter. The resultant interpolated in-phase signal is a full bandwidth signal and is substantially free of aliasing distortion.

7 Claims, 7 Drawing Sheets

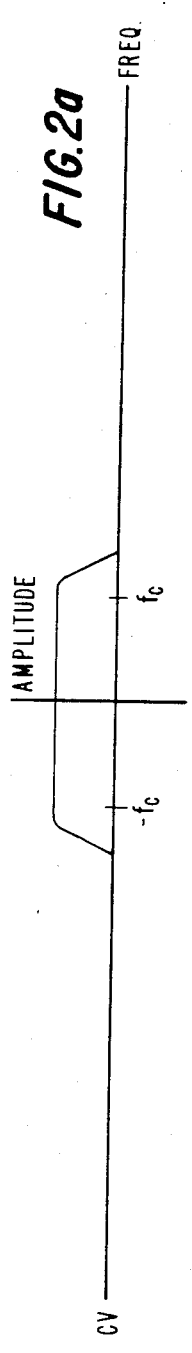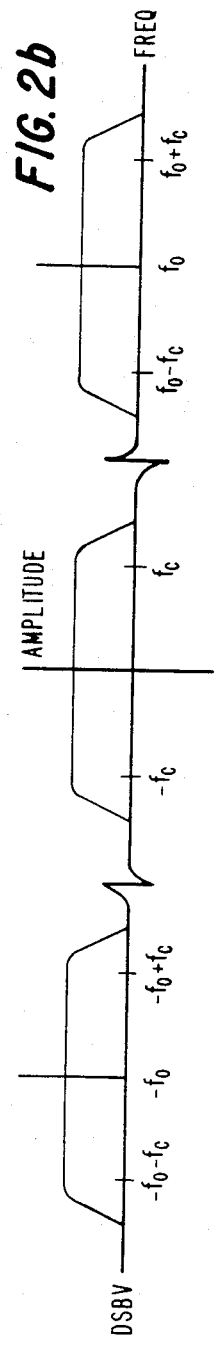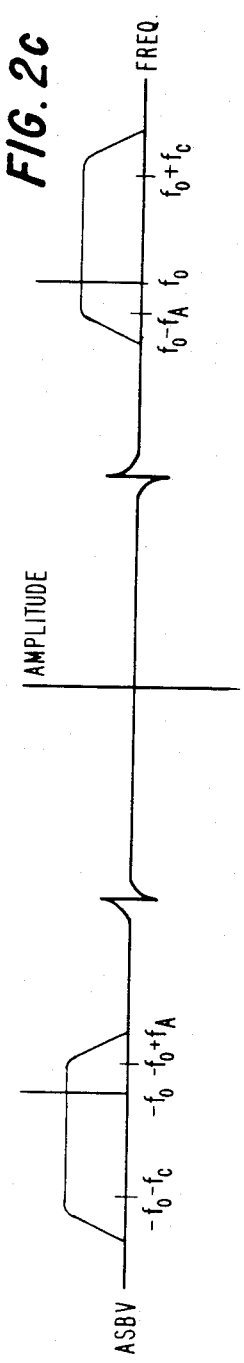

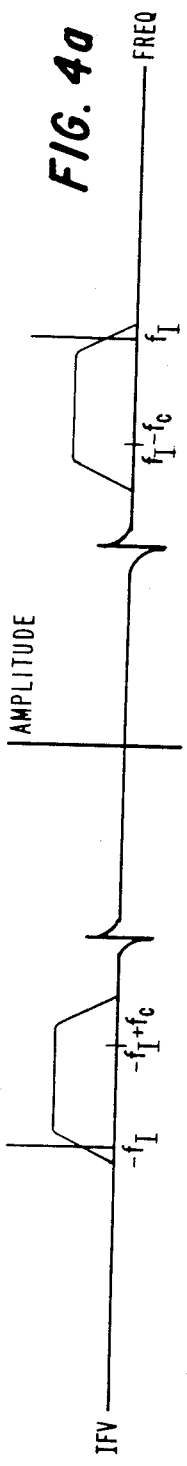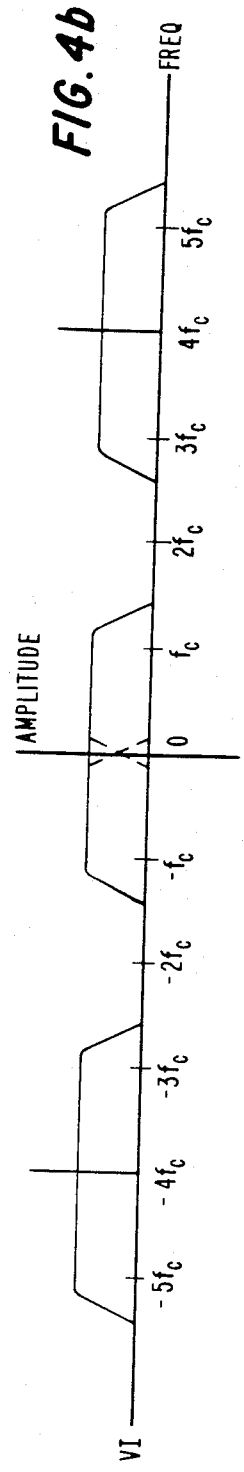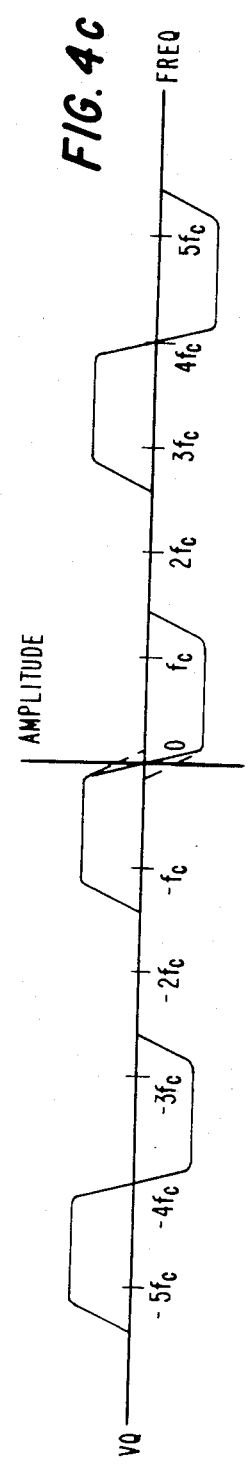

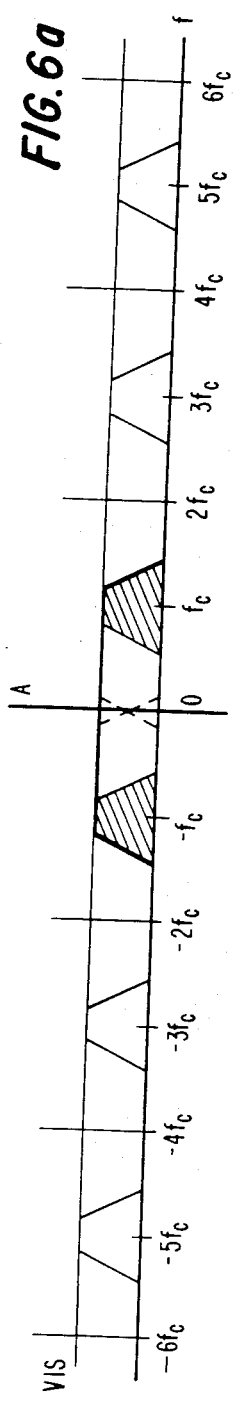
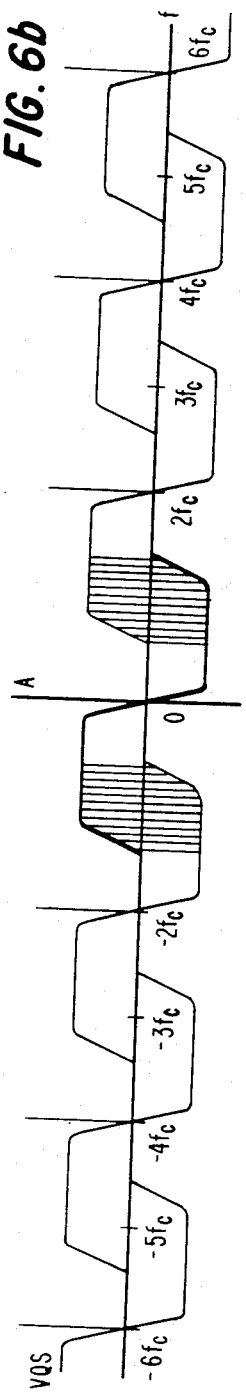
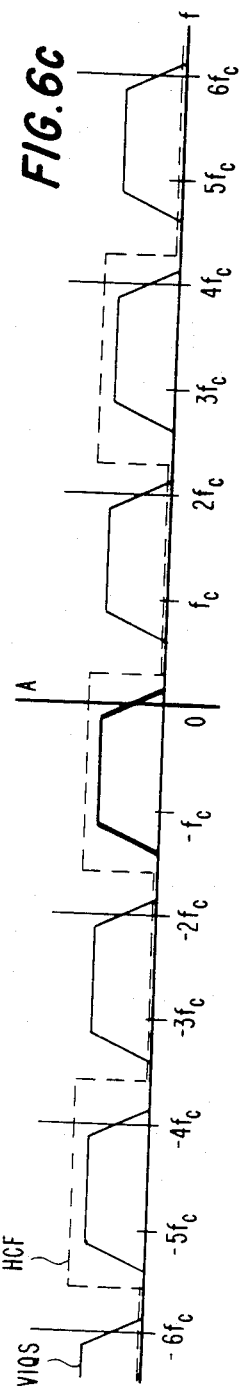

SUBNYQUIST DEMODULATOR AS FOR A TELEVISION RECEIVER

The present invention relates to circuitry which samples the in-phase and quadrature phase signal components of an asymmetric sideband modulated (ASM) signal, using a sampling frequency that is less than the Nyquist rate, and which processes these subsampled signals to recover a full bandwidth in-phase component that is substantially free of aliasing distortion.

In order to make efficient use of the broadcast spectrum, an NTSC television signal is modulated with asymmetric sidebands. The lower frequencies of the baseband video signal, from 0 to 1.25 MHz are double sideband modulated (DSM) and the higher frequency components from 1.25 MHz to 4.2 MHz are single sideband modulated (SSM). This method of modulation was chosen to preserve as much of the broadcast spectrum as possible without attenuating the low frequency components of the composite video signal. The rational behind the ASM method chosen for NTSC video signals is explained in a section of a textbook by Stein et al., *Communications Systems and Techniques,* McGraw Hill, 1966, pp 621–638, which is hereby incorporated by reference. Since the sidebands are not symmetric, the quadrature phase components of the video carrier signal are non-zero. As broadcast, the DSM portion of a conventional NTSC signal has a zero valued quadrature signal component while the SSM portion has a quadrature signal component that is the Hilbert transform of the baseband signal from 1.25 MHz to 4.2 MHz.

Recently, there has been an increased interest in utilizing the quadrature phase modulation component of radio frequency (RF) television signals. For example, in U.S. Pat. No. 4,703,357 entitled, "Adaptive Television Deghosting System," which is hereby incorporated by reference, compounds of a television signal which are both in-phase with and quadrature phase related to the video carrier signal are used to cancel multipath or ghost signal distortion in the television signal. In addition, it has been processed in an article by Y. Yasumoto et al. entitled "*A Wide Aspect Ratio Television System With Full NTSC Compatibility*", IEEE Transactions on Consumer Electronics, February 1988, pp. 121–127, that information not contained in the in-phase component of a television signal, which occupies a band of frequencies between 0 and 1.25 MHz, be modulated onto a carrier which is in quadrature with the video carrier. At a receiver, this information would be recovered using synchronous demodulation and used to enhance the picture information conveyed by the in-phase component of the television signal.

In both of these systems, the in-phase and quadrature phase components of the television signal are recovered using separate synchronous demodulators and then digitized using separate analog to digital converters (ADCs). In the above-referenced patent, both of the ADCs operate at a sampling rate of 4 fc, four times the frequency, fc, of the color subcarrier signal.

An alternative scheme for digitizing in the in-phase and quadrature phase components of a television signal is presented in U.S. Pat. No. 4,686,570 entitled, "Analog-To-Digital Converter As For An Adaptive Television Deghosting System", which is hereby incorporated by reference. In this second referenced patent, a single ADC operating at a sampling rate of 8 fc is used to recover both the in-phase and quadrature phase components of the television signal. This ADC demodulates the television signal directly by sampling an intermediate frequency (IF) modulated television signal at instants corresponding to the in-phase and quadrature phase modulation components of the IF carrier signal. In addition to using a higher sampling frequency than the first referenced patent, the second referenced patent uses an IF carrier that is locked in phase to the color synchronizing burst signal component of the received television signals.

It would be desirable if a digitizing system could be provided which uses a comparatively low sampling rate to provide both the in-phase and quadrature phase modulation components of a television signal.

SUMMARY OF THE INVENTION

The present invention is embodied in signal sampling apparatus which includes circuitry that develops samples representing the in-phase and quadrature phase components of an ASM signal at a sample rate less than the Nyquist rate for one of the comonents, and circuitry that processes the two sampled signals as a single complex signal (i.e. one having real and imaginery components) to recover the one component of the original signal at its full bandwidth and substantially free of aliasing distortion.

BRIEF DESCRIPTION OF THE DRAWINGS

FIGS. 2a, 2b and 2c are diagrams showing the frequency spectra of signals which are useful for explaining the operation of the transmitter shown in FIG. 1.

FIGS. 4a, 4b and 4c are diagrams showing the frequency spectra of signals which are useful for explaining the operation of the prior art receiver shown in FIG. 3.

FIGS. 6a, 6b and 6c are diagrams showing the frequency spectra of signals which are useful for explaining the operation of the receiver shown in FIG. 5.

DETAILED DESCRIPTION

Figure 1:
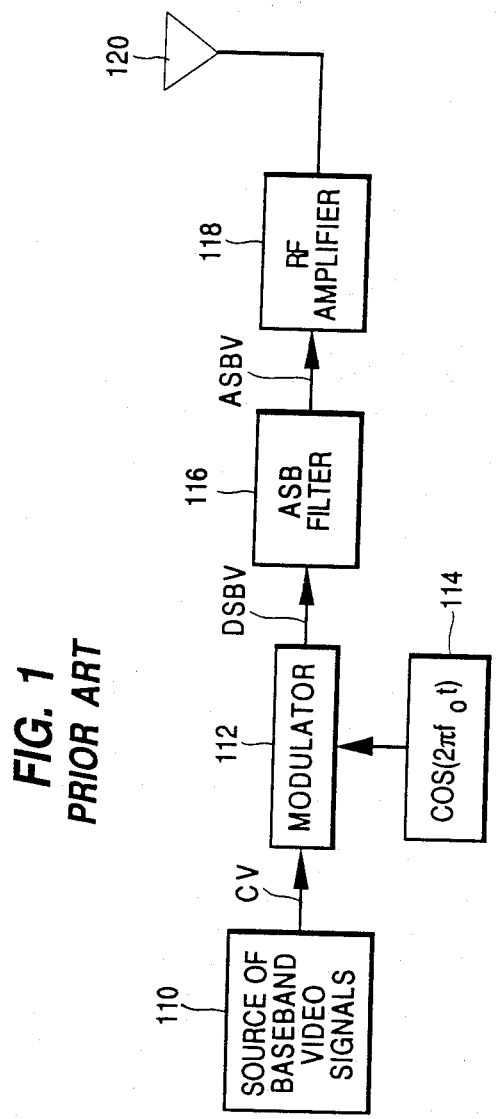
FIG. 1 (prior art) is a simplified block diagram of a television signal transmitter.

While the present invention has general application to ASM signals, for example, single sideband modulated (SSM) signals or a vestigial sideband modulated (VSM) signals, the description below is primarily concerned with NTSC television signals which are a particular type of ASM signal as described above.

In the drawings, broad arrows represent busses for conveying multiple-bit parallel digital signals and line arrows represent connections for conveying analog signals or single-bit digital signals. Depending on the processing speed of the devices, compensating delays may be required in certain of the signal paths. One skilled in the art of digital signal processing circuit design will know where such delays are needed in a particular system.

FIG. 1 is a simplified block diagram of an NTSC television transmitter. In FIG. 1, a source of baseband video signals 110 provides a composite video signal, CV, to one input port of a modulator 112. The frequency spectrum of the signal CF is shown in FIG. 2a where fc is the color subcarrier frequency. The modulator 112 multiplies the signal CV by a carrier signal, CS(t), which is described by the equation (1).

$$CS(t) = 2 \text{ cosine } (2\pi f_0 t) \tag{1}$$

The output signal, DSBV, produced by the modulator 112 is a DSM video signal. The frequency spectrum of the signal DSBV is shown in FIG. 2b. The signal DSBV is applied to an asymmetric sideband (ASB) filter 116. The filter 116 is a high-pass filter which eliminates the baseband component of the signal DSBV and the part of the lower sideband component of the modulated video signals which occupies the band of frequencies between $(f_o - 4.2)$ MHz and $(f_o - 1.25)$ MHz and the corresponding negative frequencies. The output signal, ASBV, provided by the filter 116 is an ASM television signal the frequency spectrum of which is shown in FIG. 2c. The signal ASBV is applied to an RF amplifier 118 the output of which is coupled to an antenna 120.

Figure 3:
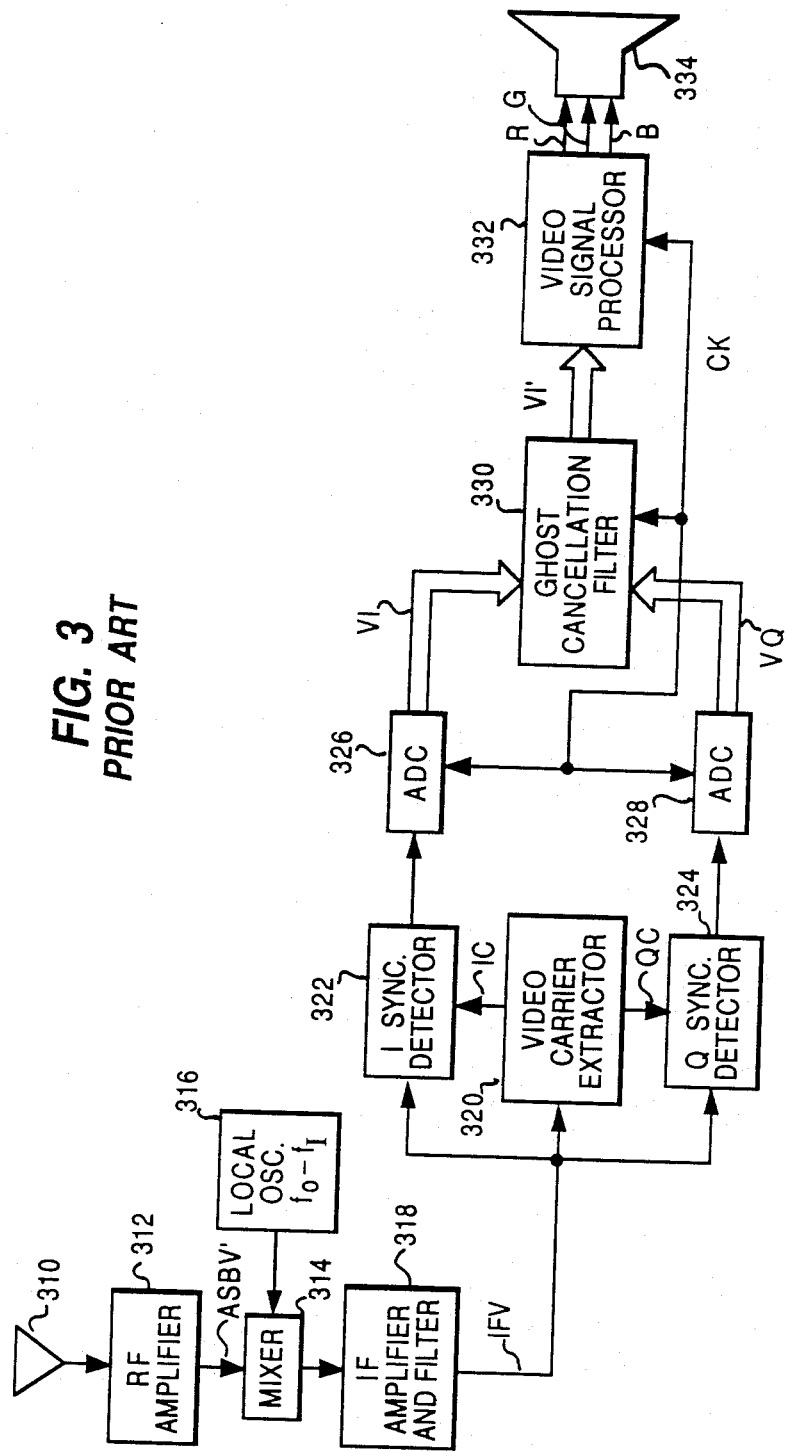
FIG. 3 (prior art) is a block diagram of a television receiver which includes a complex filter for cancelling multipath distortion.

FIG. 3 is a block diagram of a prior art television receiver which includes a complex ghost cancellation filter. In FIG. 3, the signal broadcast by the transmitter shown in FIG. 1 is received by an antenna 310 and amplified by an RF amplifier 312. The signal, ASBV', provided by the amplifier 312 is a replica of the ASM signal, ASBV, developed at the transmitter. The signal ASBV' is applied to a mixer 314 which heterodynes the signal ASBV' with an oscillatory signal provided by a local oscillator 316 to generate an intermediate frequency (IF) video signal. The output signal provided by the mixer 314 is amplified and filtered by an IF amplifier 318, the output signal of which is a signal IFV. The frequency spectrum of the signal IFV is shown in FIG. 4a. Note that in FIG. 4a, the relative frequencies of the sidebands is reversed, that is to say, the carrier frequency $f_I$ is higher than the color subcarrier frequency, $f_I - fc$. Also note that the upper sideband of the modulated IF signal has been subjected to a Nyquist filter which has a transition band that is centered about the carrier frequency. The Nyquist filtering of the modulated IF signal has the effect of introducing signal energy into the quadrature modulation component of the video signal in the range of frequencies between 0 and 1.25 MHz (i.e. the DSM portion of the video signal).

The signal, IVF, provided by the IF amplifier and filter 318 is applied to a video carrier extractor, 320 and to in-phase (I) and quadrature phase (Q) synchronous detectors 322 and 324, respectively. The video carrier extractor 320, which may include conventional phase locked loop (PLL) circuitry, produces a first reference signal, IC, that is aligned in frequency and phase with the video carrier signal component of the IF video signal, IFV. The extractor 320 also produces a second reference signal, QC, that is shifted in phase by 90° with respect to the signal IC. The signal IC is applied to the I synchronous detector 322 and the signal QC is applied to the Q synchronous detector 324.

The synchronous detectors 322 and 324 demodulate the IF signals into respective in-phase and quadrature phase components. The in-phase components are applied to an analog-to-digital converter (ADC) 326 and the quadrature phase components are applied to an ADC 328. The ADCs 326 and 328 develop digital samples representing the in-phase and quadrature phase modulation component of the IF signal at instants determined by a sampling clock signal, CK. The signal CK may be, for example, a burst locked clock signal having a frequency of 4 fc, four times the frequency, fc, of the color subcarrier signal component of the baseband video signal. In the system shown in FIG. 3, the signal CK is generated by conventional PLL circuitry (not shown) internal to the video signal processor 332.

The digital frequency spectra of the signal VI generated by the ADC 326 and of the signal VQ generated by the ADC 328 are shown in FIGS. 4b and 4c respectively. The in-phase component, VI, has substantially the same baseband frequency spectrum as the composite video signal, CV, shown in FIG. 2a. The baseband frequency spectrum of the quadrature component, VQ, may be thought of as being able to combine with the signal VI to form a complex baseband signal (i.e. one having real and imaginary components), that has asymmetrical sidebands.

The output signal, VI, of the ADC 326 and the output signal, VQ, of the ADC 328 are applied to a ghost cancellation filter 320. The above-referenced U.S. Pat. No. 4,703,357 describes exemplary circuitry which may be used as the ghost cancellation filter 320.

As described in the above-referenced U.S. Patent, the ghost cancellation filter produces a signal, VI', which corresponds to the in-phase component of a composite video signal which has been corrected for multipath or ghost signal distortion. The signal VI' is applied to a conventional video signal processor which may include, for example, circuitry to separate the luminance and chrominance components from the composite video signal and to process these components to produce red, green and blue primary color signals (R, G, and B, respectively) for application to a display device 334.

Figure 5:
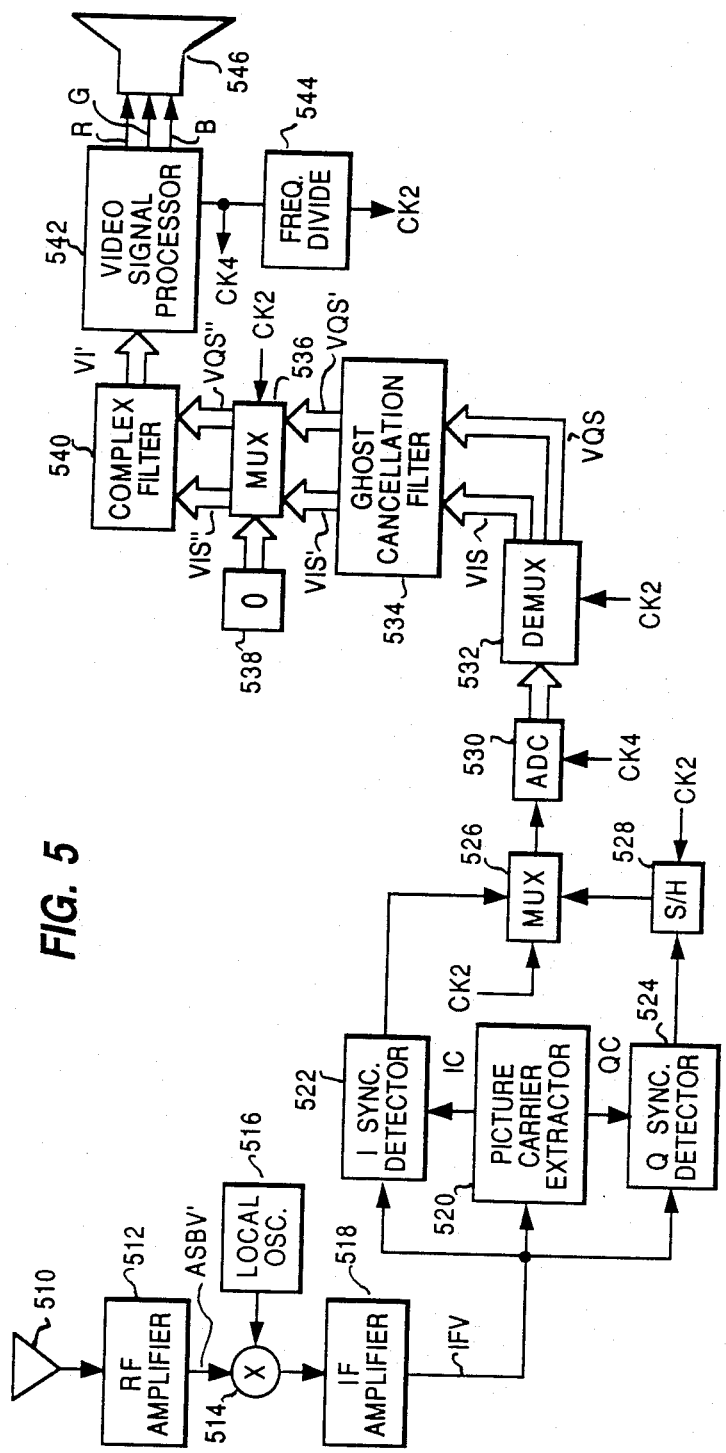
FIG. 5 is a block diagram of a television receiver which includes an embodiment of the present invention.

FIG. 5 is a block diagram of a television receiver which includes an embodiment of the present invention. This receiver is similar to the one shown in FIG. 3, except that it uses only one ADC 530 operating at a 4 fc sampling frequency which subsamples and digitizes both the in-phase and quadrature phase components of the video signal. The resultant sample rate for each component is 2 fc, two times the frequency, fc, of the color subcarrier signal. The receiver shown in FIG. 5 also includes circuitry 536, 538, and 540 which combines the subsampled in-phase and quadrature phase components of the deghosted video signal to generate an in-phase baseband signal that is substantially free of any aliasing distortion which may have occurred as a result of subsampling.

In FIG. 5, the antenna, 510, RF amplifier, 512, mixer 514, local oscillator 516, IF amplifier and filter 518, video carrier extractor 520 and the I and Q synchronous demodulators 522 and 524 perform the identical function of the corresponding components of the receiver shown in FIG. 3. Consequently, these components are not described.

The signl provided by the I synchronous detector 522 is applied to one input terminal of an analog multiplexer 526. Another input terminal of the multiplexer 526 is coupled to receive the output signal of the Q synchronous detector as provided by a sample and hold (S/H) circuit 528. Both the multiplexer 526 and the S/H circuitry 528 are controlled by a signal CK2 provided by frequency divide-by-two circuitry 544. The signal CK2 has a frequency substantially equal to 2 fc. The multiplexer 526 is conditioned by the signal CK2 to pass the signal provided by the I synchronous detector 522 when CK2 has a value of logic-zero and to pass the signal provided by the S/H circuitry 528 when CK2 has a value of logic-one. The S/H circuitry used in this embodiment of the invention is conditioned by the signal CK2 to sample the signal provided by the Q synchronous detector coincident with negative-going transitions of the signal CK2 and to hold the sample value until the next negative going transition of CK2. The output signal of the multiplexer 526 is a stream of analog sample values having a sampling frequency of 4 fc, where alternate samples represent baseband in-phase and quadrature phase modulation components of the intermediate frequency video signal. The alternate samples of the in-phase component occur at a rate of 2 fc and the intervening quadrature phase component also occur at a rate of 2 fc. Since the bandwidth of the luminance component of the video signal is 4.2 MHz (NTSC) and the subcarrier frequency, fc, is 3.58 MHz, a sampling rate of 2 fc is less than the requisite rate to satisfy the Nyquist criterion (i.e., $2 \times 3.58 = 7.16$ MHz $< 2 \times 4.2 = 8.4$ MHz).

The output signal of the multiplexer 526 is applied to an ADC 530 which digitizes the sample stream coincident with negative-going transitions of a sampling clock signal, CK4, which has a frequency of 4 fc. The signal CK4 corresponds to the signal CK of FIG. 3; it is applied to the input terminal of the frequency divide-by-two circuitry 544 to generate the signal CK2. The output signal of the ADC 530 is applied to the input port of a demultiplexer 532. The demultiplexer 532 is responsive to the clock signal CK2 for splitting the 4 fc sampled data signal provided by the ADC 530 into two 2 fc sampled data signals, VIS and VQS. The signal VIS represents the baseband in-phase modulation components of the IF video signal but sampled at a rate less than its Nyquist rate. The signal VQS similarly represents the subsampled baseband quadrature phase modulation components of the IF video signal. Corresponding samples of the signals VIS and VQS have substantially the same sampling instant.

Frequency spectra for the signals VIS and VQS are shown in FIGS. 6a and 6b, respectively. A bold line delimits the baseband spectrum in each of these figures. The shaded areas represent frequency bands that include aliasing distortion from the immediately adjacent repeat spectra. As illustrated by FIGS. 6a and 6b, both the in-phase signal, VIS, and the quadrature phase signal, VQS, are contaminated with aliasing distortion.

FIG. 6c is a diagram of the frequency spectrum of the complex signal having a real part substantially equal to the signal VIS and an imaginary part substantially equal to the signal VQS. As illustrated by FIG. 6c, there is no aliasing distortion in the complex signal. Consequently, any signal processing which uses both the signals VIS and VQS as a single complex signal—for example, the ghost cancellation filter used in the above referenced U.S. Pat. No. 4,703,357—is not affected by the aliasing distortion in the component signals. Moreover, if the complex signal were passed through a filter having the transfer characteristic, HCF, graphically illustrated by the broken line in FIG. 6c, the in-phase signal component may be recovered to the substantial exclusion of any aliasing distortion.

The signals VIS and VQS are applied to a ghost cancellation filter 534, which may be identical to that described in the referenced U.S. Pat. No. 4,703,357. The output signals, VIS' and VQS', provided by the filter 534, are substantially free of any multipath distortion but have aliasing distortion as indicated by FIGS. 6a and 6b.

The signals VIS' and VQS' are next processed by a complex finite-impulse response (FIR) filter 540 having the transfer characteristic, HCF, illustrated by the broken line in FIG. 6. This filter effectively interpolates the missing samples of the in-phase signal component from the known in-phase and quadrature phase samples. Since the quadrature phase samples represent the Hilbert transform of the baseband in-phase video signal, sufficient information is present in the pair of signals VIS' and VQS' to determine the values of the missing samples of VIS' with only insignificant errors.

The first step in the filtering process is to change the sample rate of both VIS' and VQS' to 4 fc by inserting interstitial zero-valued samples into each of the sampled data signals. In the present embodiment of the invention, this step is performed by a multiplexer 536 and a source of zero-values samples 538. The multiplexer 536 is conditioned by the signal CK2 to pass the values of the signals VIS' and VQS' when the signal CK2 is in a logic-zero state and to pass a zero-valued or null sample from source 538 when CK2 is in a logic-one state. The signals VIS" and VQS" provided by the multiplexer 536 are applied to a complex filter 540.

Figure 7:
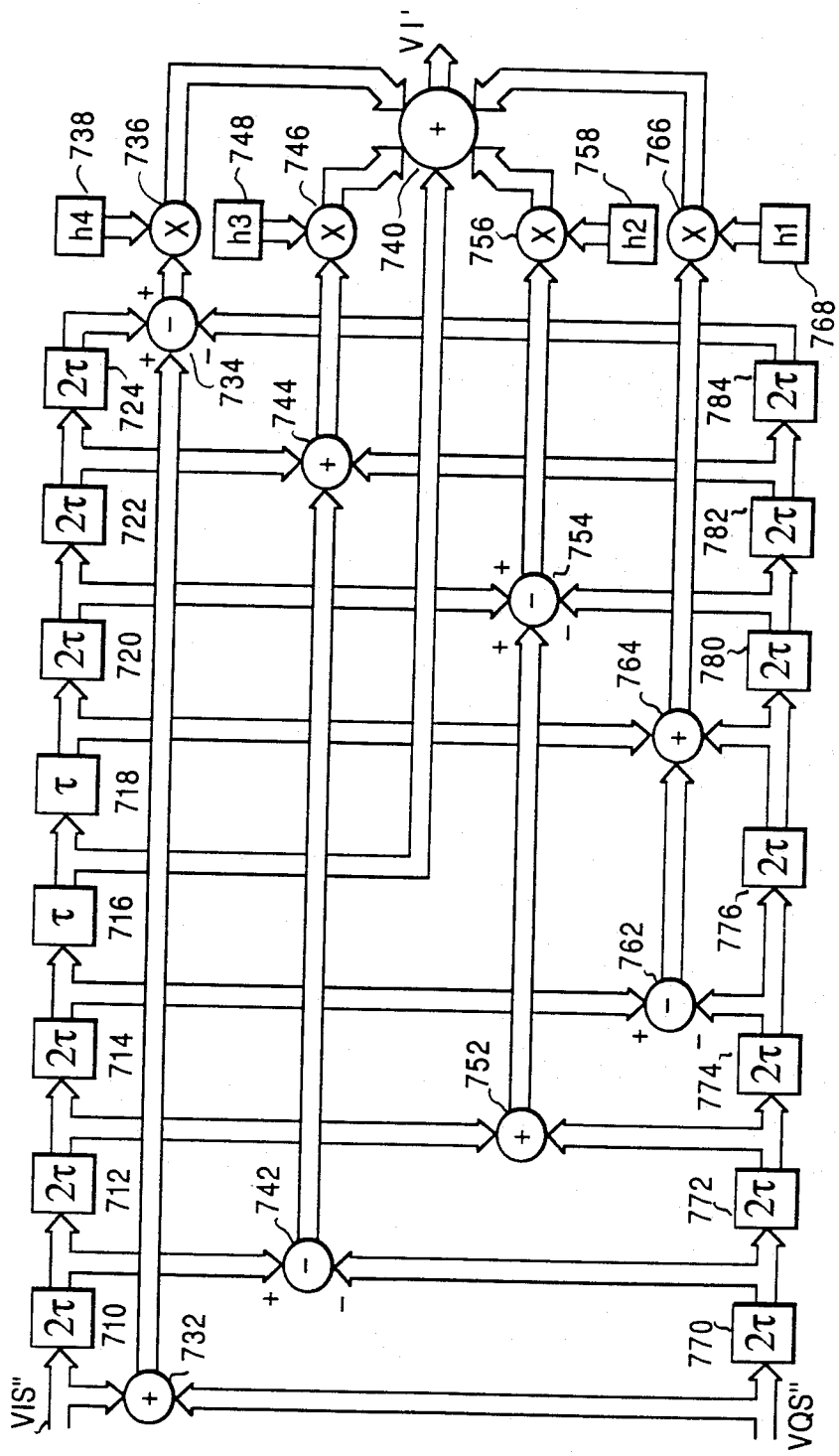
FIG. 7 is a block diagram of a complex filter suitable for use in the receiver shown in FIG. 5.

Circuitry suitable for use as the complex FIR filter 540 is illustrated in FIG. 7. In FIG. 7, the signal VIS" is applied to a delay element 710 which is the first of a group of serially connected delay elements also including delay elements 712, 714, 716, 718, 720, 722 and 724. Each of the delay elements 710 through 714 and 220 through 224 delays sample values applied to its input port by two periods of the signal CK4 (i.e., $2\tau$). The delay elements 716 and 718 delay the sample values applied to their input ports by one period of the signal CK4, (i.e., $\tau$). The quadrature phase input signal, VQS", is applied to a second group of serially connected delay elements, 770, 772, 774, 776, 780, 782 and 784, each of which provides a $2\tau$ delay. The input signals VIS" and VQS" are summed by an adder 732, and the resulting sum is applied to one input port of a signal summing network 734. The network 734 adds the signal provided by the adder 732 to a signal provided by the delay element 724 and subtracts from this sum, the signal provided by the delay element 784. The resultant sum is applied to one input port of a multiplier 736. Another input port of the multiplier 736 is coupled to receive a filter coefficient value, h4, provided by a source of digital value 738. The output signal provided by the multiplier 736 is the sum of the signals VIS", VQS" and the signal provided by the delay element 724 minus the signal provided by the delay element 784, all multiplied by the coefficient value h4. This output signal is applied to an input port of a summing network 740. In the same manner, three other sum of product terms are developed: the output signal of the delay element 770 is subtracted from the output signal of the delay element 710 by a subtractor 742 and the result is added, in a summing network 744, to the signals provided by the delay elements 744 and 782. The output signal of the summing network 744 is applied to a multiplier 746 which scales the sum by a coefficient value h3; the output signals of the delay elements 712, 772 and 720 are summed, the output signal of the delay element 780 is subtracted from this sum and the result is multiplied by a coefficient value h2; and the output signals of the delay elements 714, 776 and 718 are summed, the output signal of the delay element 774 is subtracted from this sum and the result is multiplied by a coefficient value h1. Each of these scaled sums is applied to a separate input port of the summing network 740. The signal provided by the delay elemnent 716 is also applied to the summing network 740.

The summing network 740 adds together all of the signals applied to its input ports to produce an output signal VI' which is substantially the same as the signal VI' provided by the ghost cancellation filter 300 of FIG. 3 and which is substantially free of aliasing distortion. The signal VI' is applied to a video signal processor 542 which may be identical to the processor 332 of FIG. 3, described above. The processor 542 develops primary color signals, R, G, and B, which are applied to the display device 546 to generate the television display.

The coefficient values h1 through h4 for use in the present embodiment of the invention are listed in the Table.

TABLE

| Coefficient | Value |
|---|---|
| h1 | 0.4472 |
| h2 | 0.1380 |
| h3 | −0.0715 |
| h4 | −0.0352 |

While the invention is described in the context of a conventional television receiver, it is contemplated that it may also be used to decode an enhanced television signal such as that described in the above-referenced article by Yasumoto et al. Even though the quadrature modulation component of this enhanced television signal contains information that is not in the in-phase modulation component, the complex filter 540 does not introduce cross-talk distortion between the in-phase and quadrature modulation components. Any information in the quadrature component which is not in the in-phase component is canceled by the filter 540. If this system were used to decode an enhanced television signal, it is contemplated that the signal VQS' provided by the ghost cancellation filter 534 may be applied to a complex filter similar to that shown in FIG. 7 and then band-limited to occupy a band of frequencies between 0 and 1.25 MHz. The resultant signal would be applied to the video signal processor 542 as the quadrature modulation component of the enhanced video signal.

The present invention may be used to subsample the in-phase and quadrature phase components of an ASM signal and then process the subsampled signals to recover one or both of the signals with substantially no aliasing distortion. Only one criterion should be met, that the complex signal having the in-phase and quadrature phase components as its real and imaginary parts has no aliasing distortion when sampled at the subsampling rate.

While the present embodiment of the invention used digital technology, it is contemplated that the invention may be used in an analog sampled data signal processing system.

What is claimed is:

1. Signal sampling means for developing a sampled data output signal representing information conveyed by an asymmetrical sideband modulated signal, comprising:

a source of said asymmetrical sideband modulated signal;

demodulating means coupled to said source, for generating first and second baseband signals representing respective in-phase and quadrature phase modulation components of said asymmetrical sideband modulated signal;

subsampling means, coupled to said demodulating means, for developing first and second sampled data signals representing, respectively, said first and second baseband signals and having a sampling frequency that is less than the Nyquist frequency for at least one of said first and second baseband signals, wherein said at least one of said first and second sampled data signals is contaminated by undesirable aliasing distortion; and complex signal filtering means, coupled to said subsampling means, for combining said first and second sampled data signals to generate said sampled data output signal representing said at least one of said first and second baseband signals substantially free of undesirable aliasing distortion, and having a sample frequency that is not less than the Nyquist frequency of said first and second baseband signals.

2. The signal sampling means set forth in claim 1 wherein said subsampling means comprises:

means for applying a subsampling clock signal;

multiplexing means, coupled to receive said first and second baseband signals and responsive to said subsampling clock signal for sequentially providing, during a single period of said subsampling clock signal, first and second analog values sustantially equal to respective values of said first and second baseband signals at an instant determined by said subsampling clock signal;

means for applying a sampling clock signal having a frequency not less than twice the frequency of said subsampling clock signal; and analog-to-digital conversion means coupled to said multiplexing means and responsive to said sampling clock signal for developing, during respective first and second periods of said sampling clock signal, first and second digital sample values representing, respectively, said first and second analog values, wherein said first and second digital sample values are samples of said first and second sampled data signals, respectively.

3. Signal sampling means for developing a sampled data output signal representing information conveyed by an asymmetrical sideband modulated signal, comprising:

a source of said asymmetrical sideband modulated signal;

demodulating means coupled to said source, for generating first and second baseband signals representing respective in-phase and quadrature phase modulation components of said asymmetrical sideband modulated signal;

subsampling means, coupled to said demodulating means, for developing first and second sampled data signals representing, respectively, said first and second baseband signals and having a sampling frequency that is less than twice the highest frequency component of at least one of said first and second baseband signals, wherein at least one of said first and second sampled data signals is contaminated by undesirable aliasing distortion;

multiplexing means, coupled to receive said first and second samples data signals, and coupled to a source of null signal value and responsive to said subsampling clock signal, for providing samples of said first and second sampled data signals each interleaved with samples of said null signal to generate respective first and second further sampled data signals; and complex finite impure response filtering means for combining said first and second further sampled data signals as respective real and imaginary parts of a single complex signal, to generate said sampled data output signal which represents said at least one of said first and second baseband signals substantially free of undesirable aliasing distortion and having a sample frequency that is not less than twice the highest frequency component of said first and second baseband signals.

4. Apparatus for demodulating an asymmetrical sideband modulated television signal, comprising:

a source of said asymmetrical sideband modulated television signal;

demodulating means coupled to said source, for generating first and second baseband signals representing respective in-phase and quadrature phase modulation components of said asymmetrical sideband modulated television signal;

subsampling means, coupled to said demodulating means, for developing first and second sampled data signals representing, respectively, said first and second baseband signals and having a sampling frequency that is less than twice the highest frequency component of said first baseband signal, wherein said first sampled data signal is contaminated by undesirable aliasing distortion; and complex signal filtering means, coupled to said subsampling means, for combining said first and second sampled data signals to generate a sampled data output signal, having a sample frequency that is not less than twice the highest frequency component of said first baseband signal, and representing said first baseband signal substantially free of undesirable aliasing distortion.

5. The apparatus set forth in claim 4 wherein said subsampling means comprises:

means for applying a subsampling clock signal;

multiplexing means, coupled to receive said first and second baseband signals and responsive to said subsampling clock signal for sequentially providing, during a single period of said subsampling clock signal, first and second analog values substantially equal to respective values of said first and second baseband signals at an instant determined by said subsampling clock signal;

means for applying a sampling clock signal having a frequency not less than twice the frequency of said subsampling clock signal; and analog-to-digital conversion means coupled to said multiplexing means and responsive to said sampling clock signal for developing, during respective first and second periods of said sampling clock signal, first and second digital sample values representing, respectively, said first and second analog values, wherein said first and second digital sample values are samples of said first and second sampled data signals, respectively.

6. The apparatus set forth in claim 5 wherein said asymmetrical sideband modulated television signal includes a color information signal component which modulates a suppressed color subcarrier signal having a predetermined frequency; and wherein said subsampling clock signal has a frequency substantially equal to twice said predetermined frequency; and said sampling clock signal has a frequency substantially equal to four times said predetermined frequency.

7. Apparatus for demodulating an asymmetrical sideband modulated television signal, comprising:

a source of said asymmetrical sideband modulated television signal;

demodulating means coupled to said source, for generating first and second baseband signals representing respective in-phase and quadrature phase modulation components of said asymmetrical sideband modulated television signal;

subsampling means, coupled to said demodulating means, for developing first and second sampled data signals representing, respectively, said first and second baseband signals and having a sampling frequency that is less than twice the highest frequency component of said first baseband signal, wherein said first sampled data signal is contaminated by undesirable aliasing distortion;

multiplexing means, coupled to receive said first and second sampled data signals and to a source of null signal value and responsive to said subsampling clock signal, for providing samples of said first and second sampled data signals interleaved with samples of said null signal to generate respective first and second further sampled data signals; and complex finite impulse response filtering means for combining said first and second further sampled data signals as respective real and imaginary parts of a single complex signal, to generate said sampled data output signal, having a sampling frequency that is not less than twice the highest frequency component of said first baseband signal, representing said first baseband signal and being substantially free of undesirable aliasing distortion.

* * * * *

UNITED STATES PATENT AND TRADEMARK OFFICE
CERTIFICATE OF CORRECTION

PATENT NO. : 4,870,480

DATED : September 26, 1989

INVENTOR(S) : Tzy-Hong S. Chao

It is certified that error appears in the above-identified patent and that said Letters Patent is hereby corrected as shown below:

Col. 1, line 38, change "compounds" to --components--.

Col. 1, line 61, after "digitizing" delete "in".

Col. 7, line 9, change "300" to --330--.

Col. 8, line 65, change "samples" to --sampled--.

Col. 9, line 4, change "impure" to --impulse--.

Signed and Sealed this

Twenty-third Day of October, 1990

Attest:

HARRY F. MANBECK, JR.

*Attesting Officer*      *Commissioner of Patents and Trademarks*